United States Patent [19]
Barron et al.

[11] Patent Number: 5,267,325
[45] Date of Patent: Nov. 30, 1993

[54] LOCATING CHARACTERS FOR CHARACTER RECOGNITION

[75] Inventors: Paul S. Barron, Westland; Wayne H. Bentley, Plymouth; John F. Currie, Farmington Hills; Steve R. Krebs, Ypsilanti Twp.; Roger E. Ridl, Canton, all of Mich.

[73] Assignee: Unisys Corporation, Blue Bell, Pa.

[21] Appl. No.: 755,722

[22] Filed: Sep. 6, 1991

[51] Int. Cl.⁵ .............................................. G06K 9/34
[52] U.S. Cl. ................................................ 382/9; 382/48
[58] Field of Search ................................ 382/9, 55, 48

[56] References Cited

U.S. PATENT DOCUMENTS

| | | | |
|---|---|---|---|
| 4,926,490 | 5/1990 | Mano | 382/9 |
| 5,033,104 | 7/1991 | Amano | 382/56 |
| 5,038,381 | 8/1991 | Nelson | 382/18 |
| 5,048,100 | 9/1991 | Kuperstein | 382/36 |
| 5,054,091 | 10/1991 | Tanaka et al. | 382/48 |
| 5,144,682 | 9/1992 | Nakamura | 382/48 |

OTHER PUBLICATIONS

Wong et al., "Document Analysis System", IBM Journal of Research and Development, vol. 26, No. 6, Nov. 1982, pp. 647-651.

Primary Examiner—Leo H. Boudreau
Assistant Examiner—Larry J. Prikockis
Attorney, Agent, or Firm—Nathan Cass; Mart T. Starr

[57] ABSTRACT

Characters are located in a character recognition system by providing images in response to scanning characters, and then smearing black pixels in an image in up and down and left and right directions for detecting corners which are used to produce candidate character frames. These candidate character frames are scored based on how well they correspond to character size and expected location to determine which character frames are to be submitted for character recognition.

27 Claims, 12 Drawing Sheets

LEGEND

■ BLACK PIXEL
▨ LEFT SMEAR
▧ UP SMEAR
⊠ BOTH UP AND LEFT SMEAR
| LEFT EDGE
— TOP EDGE
+ TOP-LEFT CORNER

| HEX SCAN# | 60 | 5F | 40 | 3F | 20 | 1F | 00 |
|---|---|---|---|---|---|---|---|
| CORNERS (WITH 6-BIT HEX SCAN#) | | TLC_10 | | TLC_38 | | TLC_18 | |
| | | | | BRC_3E | BRC_27 | BRC_1E | BRC_07 |
| SELECTED TL FIFO | | TL1 | | TL2 | | TL1 | |
| CORNERS IN TL1 | | TLC's CONTAINES IN TL1 FIFO | | | | | |
| CORNERS IN TL2 | | TLC's CONTAINES IN TL2 FIFO | | | | | |

RESET TL1 FIFO ON HEX SCAN#s 0.40.80.C0......
RESET TL1 FIFO ON HEX SCAN#s 20.60.A0.E0......

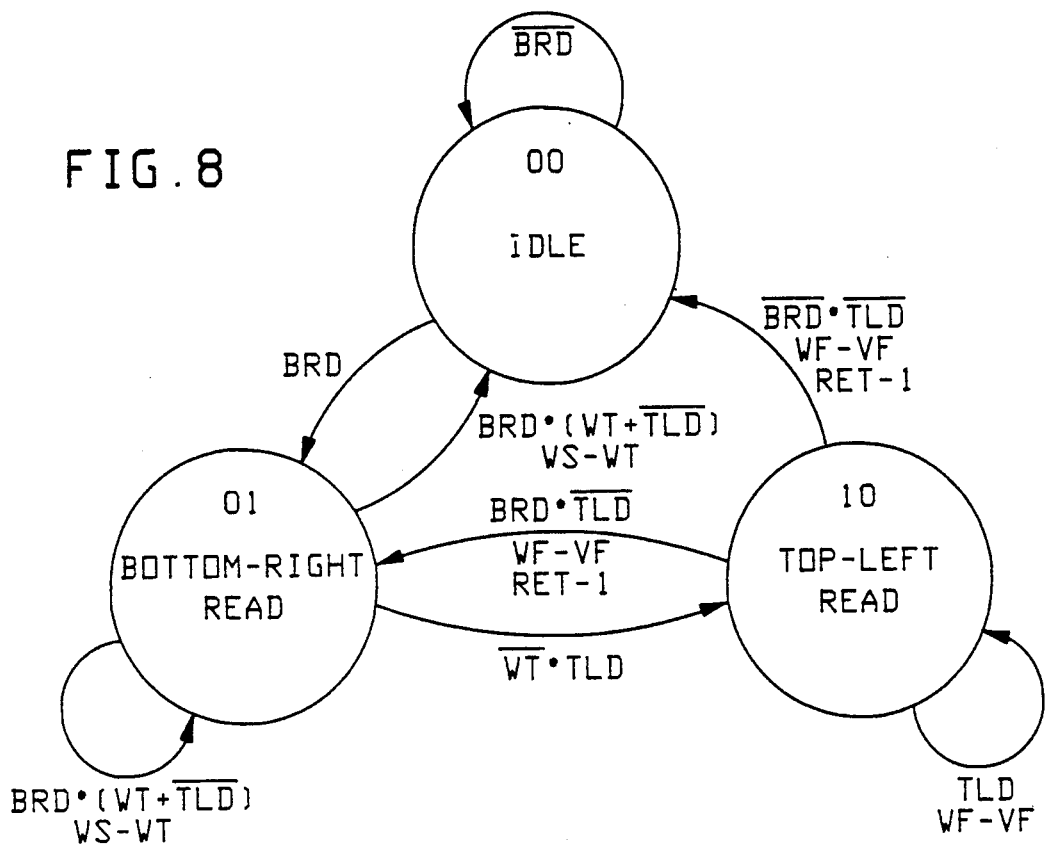

FIG. 9

INPUTS

VT: WORD TYPE SEPERATOR(WT-1)OR
    FRAME(WT-0).
BRD: BOTTOM-RIGHT FIFO HAS DATA
TLD: THE APPROPRIATE TOP-LEFT FIFO
     HAS DATA
VF: VALID FRAME.THE BOTTOM-RIGHT CORNER
    AND THE TOP-LEFT CORNER FORM A FRAME
    OF VILID SIZE ALSO.THE TOP-RIGHT AND
    BOTTOM-LEFT CORNERS EXIST.

OUTPUTS

IDLE: DO NOTHING

BOTTOM-RIGHT READ: READ THE BOTTOM-RIGHT FIFO.

TOP-LEFT READ: READ THE APPROPRIATE TOP-LEFT FIFO.

WS: WRITE A SCAN SEPERATOR TO THE DSP.

VF: WRITE A FRAME TO THE DSP.

RET: RETRANSMIT THE APPROPRIATE TOP-LEFT FIFO.

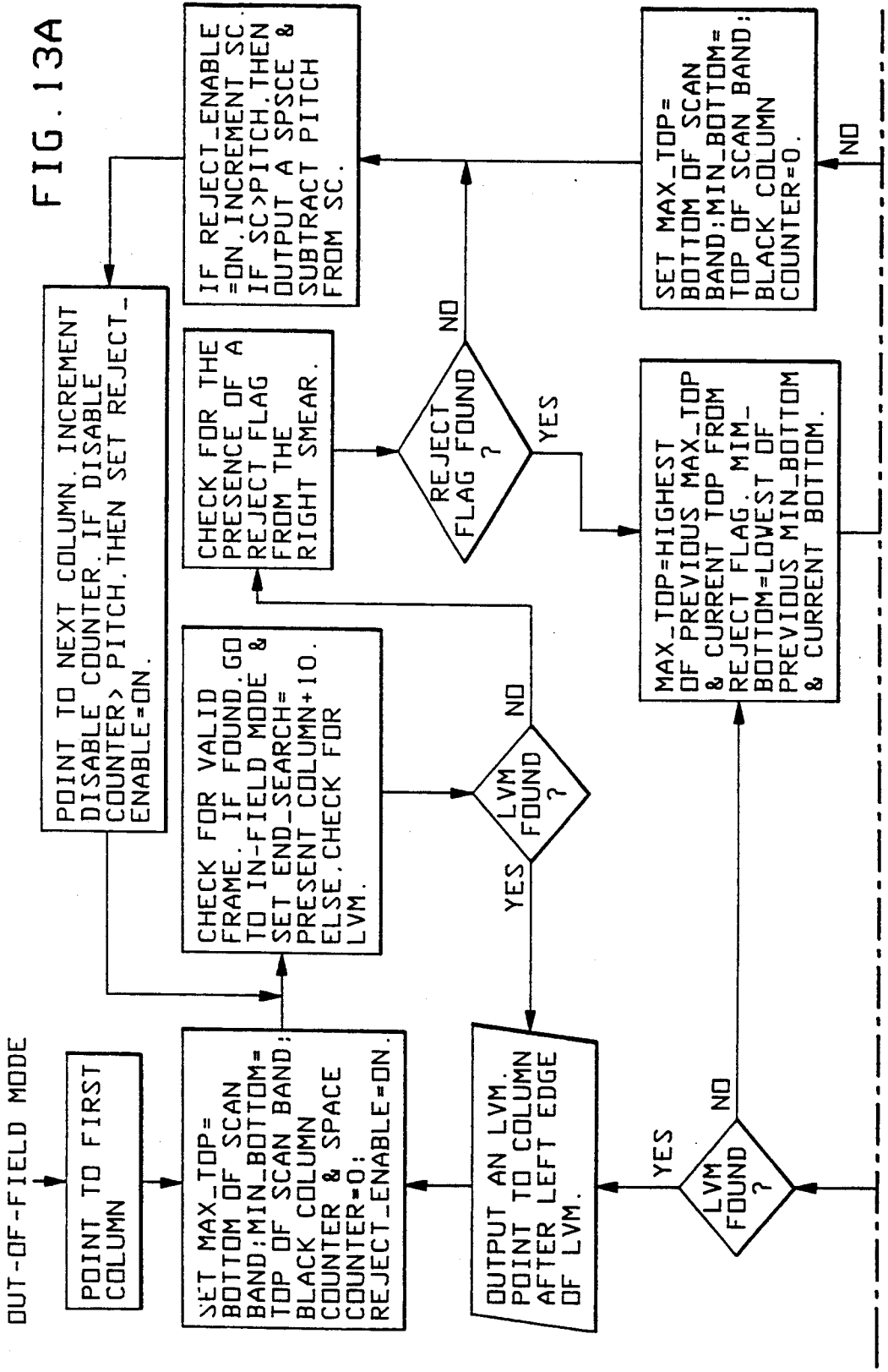

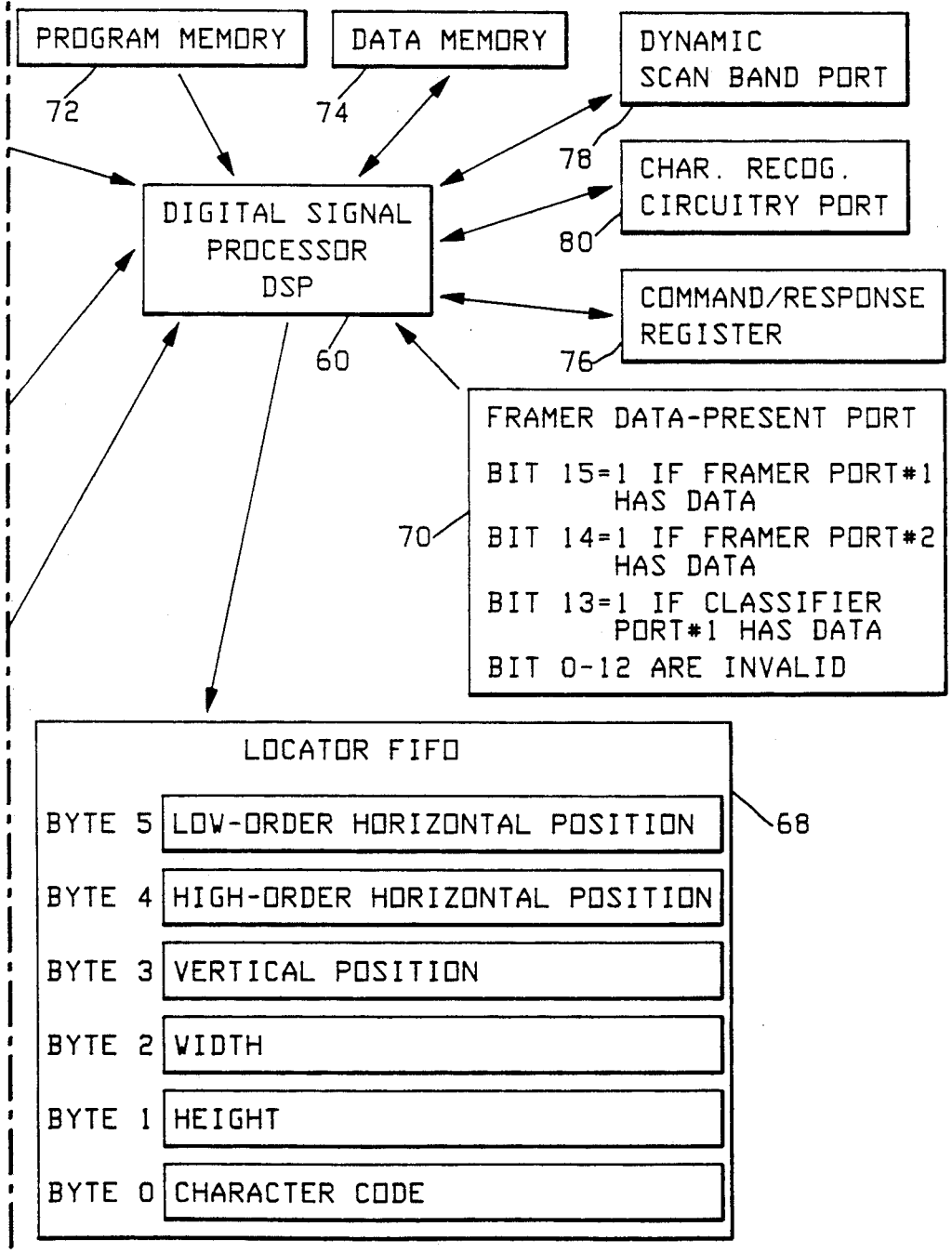

FIG. 12A

INPUTS

FRAMER FIFO PORT#1 — 62

| 15 | 14 | 13 | 12 | 12 | 10 | 8 | 7 | 6 | 5 | 4 | 3 | 2 | 1 | 0 |
|----|----|----|----|----|----|---|---|---|---|---|---|---|---|---|
| VT | 0 | FRAME SCORE ||||| Y-COORDINATE OF BR |||||||

└─ WORD TYPE=0: FRAME FOUND WORD

| 15 | 14 | 13 | 12 | 12 | 10 | 8 | 7 | 6 | 5 | 4 | 3 | 2 | 1 | 0 |
|----|----|----|----|----|----|---|---|---|---|---|---|---|---|---|
| VT | 0 | DP | F | INVALID |||||||||||

└─ F=0 IF INITIAL FONT; F-1 IF SECOND FONT
└─ DP=1 IF DOCUMENT IS PRESENT
└─ WORD TYPE=1: SCAN SEPERATOR WORD

FRAMER FIFO PORT#2 — 64

TOP-LEFT CORNER COORDINATES OF FRAME

| 15 | 14 | 13 | 12 | 12 | 10 | 8 | 7 | 6 | 5 | 4 | 3 | 2 | 1 | 0 |
|----|----|----|----|----|----|---|---|---|---|---|---|---|---|---|
| VT | 0 | X-OFFSET FROM BR ||||| Y-COORDINATE OF TL |||||||

8KX8 DUAL PORT SRAM — 66

SCAN 0

| | 7 | 6 | 5 | 4 | 3 | 2 | 1 | 0 |
|--|---|---|---|---|---|---|---|---|
| BYTE 127 | P | BLACK SPOT COUNT |||||||
| ⋮ | ⋮ ||||||||
| BYTE 2 | P | BLACK SPOT COUNT |||||||

└─ P=PIXEL VALUE

| BYTE 1 | L | FINAL REJECT TOP |||||||

└─ L=1 IF SCAN IS PART OF AN LVM

| BYTE 0 | R | FIRST REJECT TOP |||||||

└─ R-1 IF SCAN IS NEAR CHARACTER SIZED DATA

LOCATING CHARACTERS FOR CHARACTER RECOGNITION

BACKGROUND OF THE INVENTION

This invention relates generally to character recognition systems and methods, and more particularly to improved means and methods for locating characters on a document preparatory to the application of character recognition techniques on the located characters.

In many character recognition systems, a critical problem resides in locating characters which are to be automatically read using character recognition techniques. This problem becomes particularly severe where poor quality print is involved, such as broken characters and paper noise.

SUMMARY OF THE INVENTION

It is accordingly a broad object of the present invention to provide improved means and methods for locating characters in a character recognition system.

A more specific object of the invention is to provide improved means and methods for locating characters where poor quality print is involved.

Another object of the invention in accordance with the foregoing objects is to provide for implementation of character location in a relatively simple and economical manner.

In a particular preferred embodiment of the invention, characters are located using a novel approach in which an image containing potential character elements is smeared in up, down, left and right directions. The resulting smeared image is then used to produce candidate character frames which are scored based on how well they correspond to character size. These candidate character frames are then further scored based on whether they are in proper locations for the purpose of selecting the particular character frames to be submitted for character recognition.

The specific nature of the invention as well as other objects, features, uses and advantages will become apparent from the following detailed description taken in conjunction with the accompanying drawings.

BRIEF DESCRIPTION OF THE DRAWINGS

FIG. 7 is a table illustrating typical horizontal coordinates applicable to the pairing provided by the framer illustrated in FIG. 6.

FIG. 8 illustrates a preferred state diagram for the framer output control 48 in FIG. 6.

FIG. 9 is a table setting forth the meanings of various abbreviations used in FIG. 8.

FIGS. 12A and 12B are block diagrams illustrating a preferred embodiment of the output decision circuitry 50 in FIG. 2.

FIGS. 13A and 13B are flowcharts generally illustrating pertinent typical out-of-field functions performed by the output decision circuitry 50 in FIG. 12.

DETAILED DESCRIPTION

Like numerals refer to like elements throughout the figures of the drawings.

Apparatus and methods described herein are to be generally understood as constructed and operating as presently known in the art, except where otherwise indicated.

Figure 1:
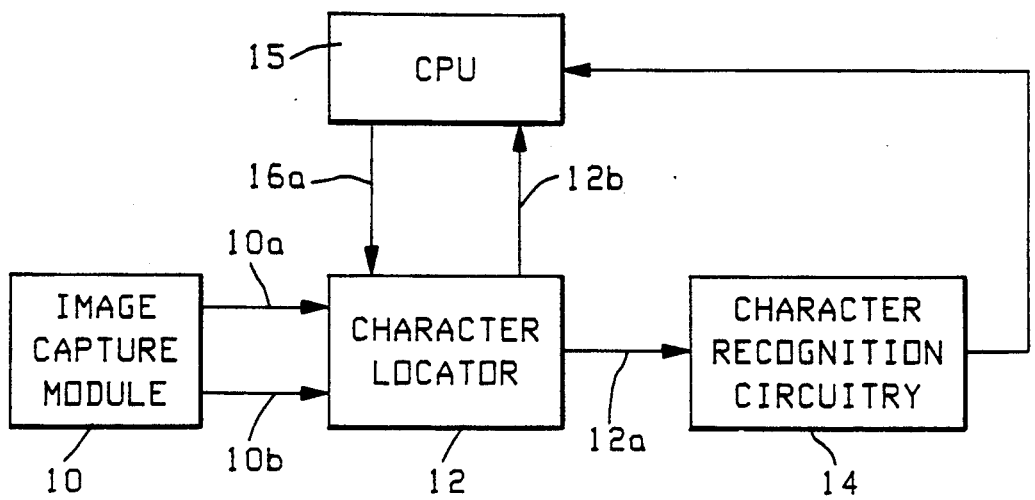
FIG. 1 is an overall block diagram of a character recognition system incorporating the invention.

Referring initially to FIG. 1, image capture module 10 provides video images 10a corresponding to the scanning of a row of characters contained on a document. These video images 10a are applied to a character locator 12. The basic operation of the character locator 12 is to locate characters in the applied video images 10a, and to send signals 12a to character recognition circuitry 14 for recognizing the located characters. Image capture module 10 also provides signals 10b to character locator 12 indicating document presence and various image characteristics, such as contrast. It will be understood that image capture module 10 and recognition circuitry 14 may be conventional, and will accordingly not be further described herein.

The characters recognized by the character recognition circuitry 14 are typically provided to a computer processing unit (CPU) 15, as shown in FIG. 1. The CPU 15 also typically provides initialization and other signals 16a to character locator 12, such as character size, font types, etc. The character locator 12 also provides output signals 12b to CPU 15 indicative of special character location characteristics.

The video image 10a provided by the image capture module 10 may typically comprise 128 "active" pixels, and at least 14 "inactive" pixels for each scan. A pixel typically represents an image area 4.6875 mils high by 4.26 mils wide.

Figure 2:
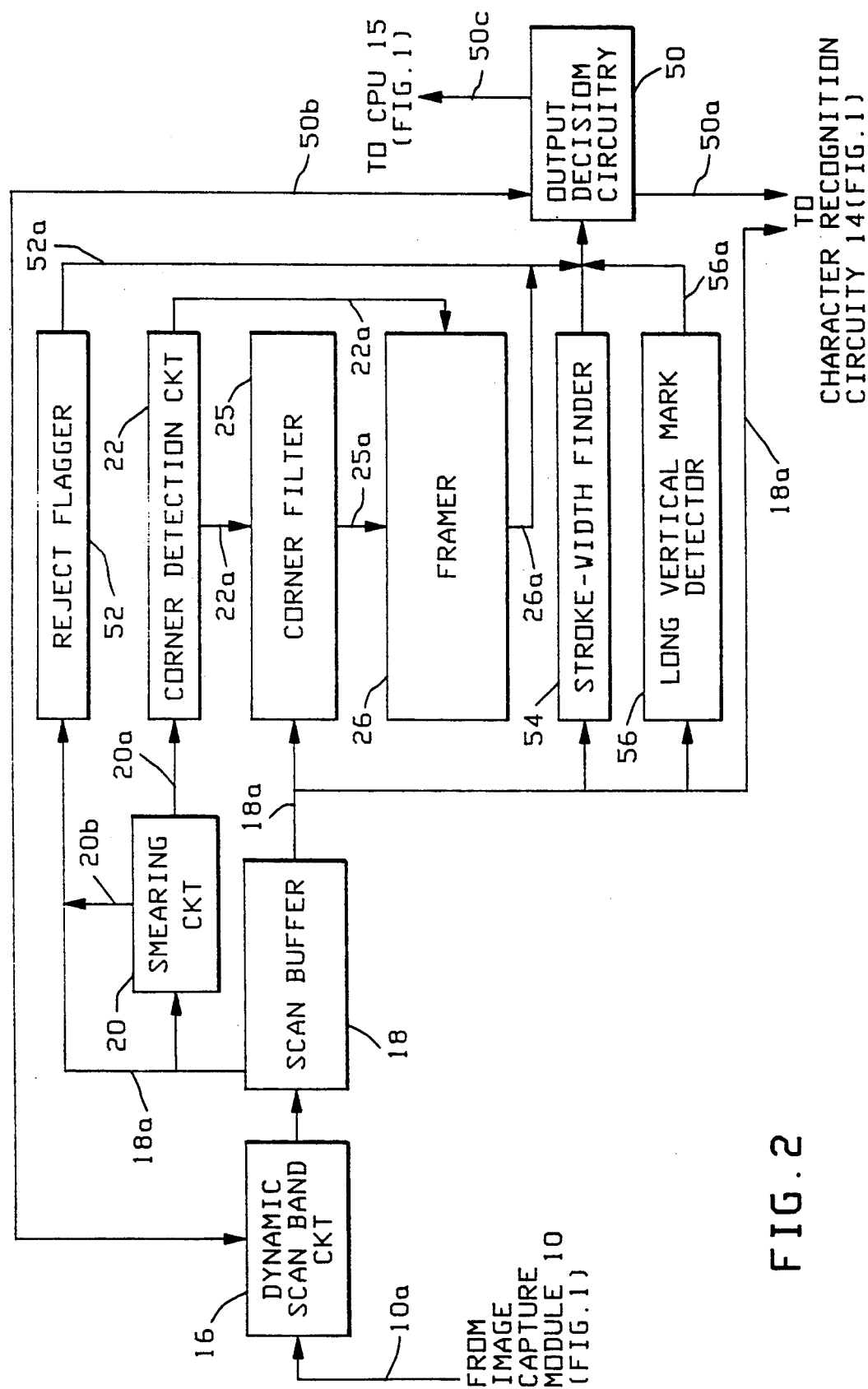
FIG. 2 is a block diagram illustrating a preferred embodiment of the character locator 12 shown in FIG. 1.

FIG. 2 illustrates a preferred embodiment of the character locator 12 shown in FIG. 1. It will be seen from FIG. 2 that video image 10a from image capture module 10 in FIG. 1 is applied to a dynamic scan band circuit 16, which typically provides a 0.6 inch tall scan band comprised of 128 pixels in the vertical direction. As is well known, the dynamic scan band circuit 16 controls the height of the scan band (scanner field of view), which is typically chosen to prevent any black marks near the fringes of the scan band from interfering with location detection. This is typically done by whiting-out all pixels outside a predetermined region of interest. The height of the scan band can be controlled by CPU output 16a (FIG. 1) or by the output 50b from output decision circuitry 50 to be described hereinafter.

Figure 3:
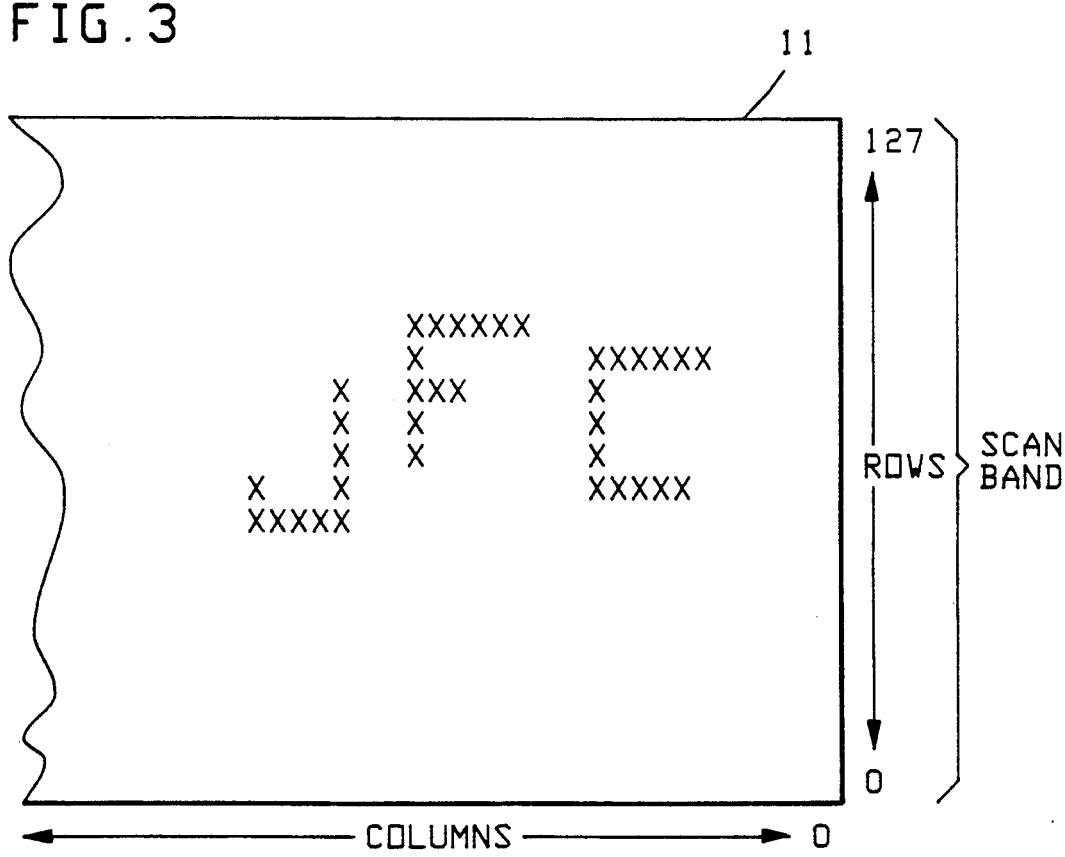
FIG. 3 is a schematic diagram illustrating a row of characters on a document and a scan band typically used for scanning these characters.

A scan buffer 18 in FIG. 2 continuously stores and updates thirty-six scans received from the dynamic scan band circuit 16, each scan comprising 128 pixels in the vertical (column) direction. FIG. 3 illustrates typical right-to-left column scanning of a document 11 provided by scan buffer 18. On each pixel-time, one entire row of the scan buffer 18 representing one pixel from each of the stored thirty-six scans is made available as a buffer output 18a.

The scan buffer output 18a is applied to a smearing circuit 20, which operates to smear black pixels (potential character elements) in the image in four directions, up, down, left and right. Preferably, the smearing provided by smearing circuit 20 typically extends approximately one character height up and down, and one character width left and right.

Figure 4:
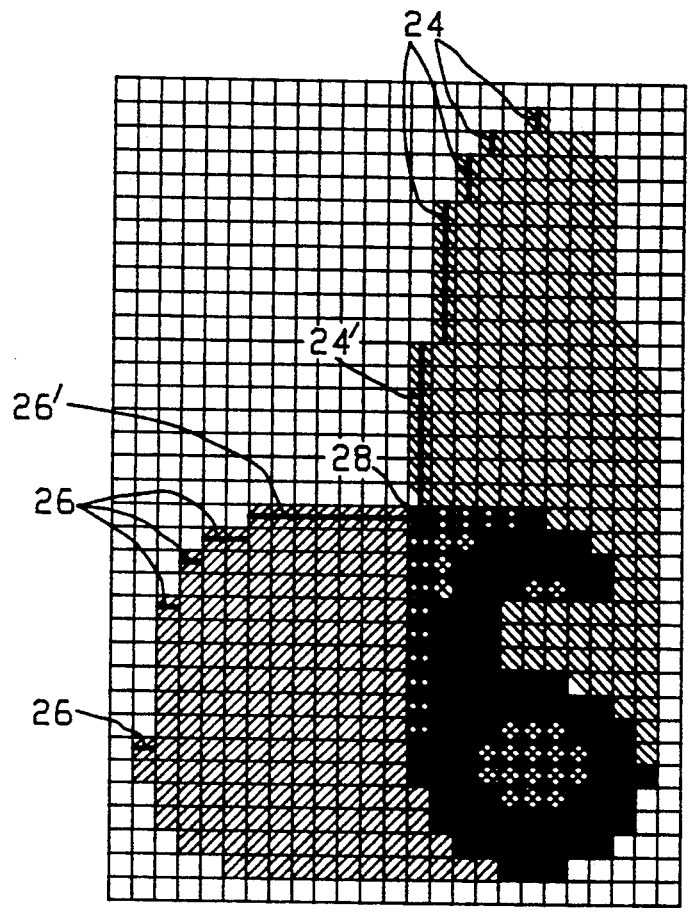
FIG. 4 is a diagram illustrating how a pixel image containing the character "6" may typically be smeared in up and left directions in accordance with the invention.
Figure 5:
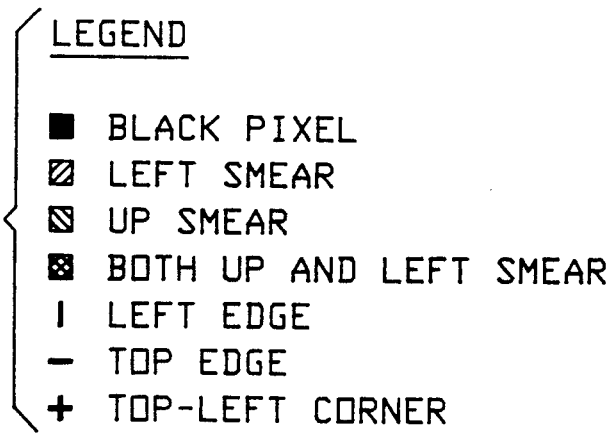
FIG. 5 is a legend associated with FIG. 4.

FIG. 4 illustrates smearing of pixels constituting a character "6" in up and left directions. Although not shown in FIG. 4, smearing in down and right directions occurs in a similar manner. As will be evident from FIG. 4, smearing is accomplished by setting to black the m consecutive pixels following a black pixel in the direction of the smear, where m is the length of the smear. FIG. 5 is a legend applicable to FIG. 4.

The resulting 4-direction smeared image 20a produced by the smearing circuit 20 in FIG. 2 is applied to a corner detection circuit 22 for detecting the top, bottom, left and right edges of a character. This is accomplished by using the up and down smears to produce left and right edges, and by using the left and right smears to produce top and bottom edges. For example, FIG. 4 illustrates how left and top edges are determined for up and left smears of the character "6". For each row of the up-smeared image, a vertical line 24 is placed in the leftmost column containing a black pixel. The left edge of the smeared image is then the leftmost vertical line 24'. For each column of the left-smeared image, a horizontal line 26 is placed in the topmost row containing a black pixel. The top edge is then the topmost horizontal line 26'.

The corner detection circuit 22 detects a corner based on the intersection of the edge of the smeared character pixels. For example, this is illustrated in FIG. 4 by the top-left corner 28 which is formed by the intersection of the left edge 24' and the top edge 26'. It will be understood that the other three corners are found in a similar manner.

More specifically, the corner detection circuit 22 provides for detecting corners from the intersection of edges in the following manner:

Top-left corners (TLC's) are the intersections of top edges found from the left smears and left edges found from the up smear.

Top-right corners (TRC's) are the intersections of top edges found from the right smears and right edges found from the up smear.

Bottom-left corners (BLC's) are the intersections of bottom edges found from the left smears and left edges found from the down smear.

Bottom-right corners (BRC's) are the intersections of bottom edges found from right smears and right edges found from the down smear.

Boolean functions for finding corners are given below, where:

$m$ = row location of pixel
$n$ = column location of pixel
$U$ = up-=smeared image
$D$ = down-smeared image
$R$ = right-smeared image
$L$ = left-smeared image
$HR$ = half-width right-smeared image
$HRE$ = half-width right-smear enable
$HL$ = half-width left-smeared image
$HLE$ = half-width left-smear enable
$'$ = compliment of pixel value Top-Right Corners:

$$TRC_{mn} = (U_{mn}U'_{m(n+1)})(R_{mn}R'_{(m+1)n} + HR_{mn}HR'_{(m+1)n}HRE)$$
$$= U_{mn}U'_{m(n+1)}R_{mn}R'_{(m+1)n} +$$
$$U_{mn}U'_{m(n+1)}HR_{mn}HR'_{(m+1)n}HRE$$

Top-Left Corners:

$$TLC_{mn} = (U_{mn}U'_{m(n-1)})(L_{mn}L'_{(m+1)n} + HL_{mn}HL'_{(m+1)n}HLE)$$
$$= U_{mn}U'_{m(n-1)}L_{mn}L'_{(m+1)n} +$$
$$U_{mn}U'_{m(n-1)}HL_{mn}HL'_{(m+1)n}HLE$$

Bottom-Right Corners:

$$BRC_{mn} = (D_{mn}D'_{m(n+1)})(R_{mn}R'_{(m-1)n} + HR_{mn}HR'_{(m-1)n}HRE)$$
$$= D_{mn}D'_{m(n+1)}R_{mn}R'_{(m-1)n} +$$
$$D_{mn}D'_{m(n+1)}HR_{mn}HR'_{(m-1)n}HRE$$

Bottom-Left Corners:

$$BLC_{mn} = (D_{mn}D'_{m(n-1)})(L_{mn}L'_{(m-1)n} + HL_{mn}HL'_{(m-1)n}HLE)$$
$$= D_{mn}D'_{m(n-1)}L_{mn}L'_{(m-1)n} +$$
$$D_{mn}D'_{m(n-1)}HL_{mn}HL'_{(m-1)n}HLE$$

Continuing with the description of the preferred embodiment of the character locator 12 in FIG. 2, the output 22a of the corner detection circuit 22 along with the scan buffer output 18a are applied to a corner filter 25 which makes a density check with respect to at least one detected corner to determine whether the corner is valid. This may typically be accomplished by determining whether a threshold number of pixels (indicative of the presence of a character) are contained within a rectangular region bounded by the corner and approximating the size of a character, so as to thereby prevent spurious noise from producing a valid corner detection. For example, with reference to FIG. 4, a typical rectangular region used for this threshold (density) measurement may be comprised of 18×24 pixels (approximately the size of a character) bounded by the detected corner formed by the intersection of left edge 24' and top edge 26'.

As illustrated in FIG. 2, a framer 26, receives the output 25a from the corner filter 25 and the output 22a from the corner detection circuit 22a. Corners which fail the density check of corner filter 25 are discarded. The purpose of the framer 26 is to use valid corners detected by corner detection circuit 24 to produce valid frames, which are scored based on character size and then passed via framer output 26a as scored candidate character frames to output decision circuitry 50. Framer output 26a also includes positional and status information (such as document presence and font type) in the form of scan separators. A preferred embodiment of the framer 26 is illustrated in FIG. 6.

Figure 6:
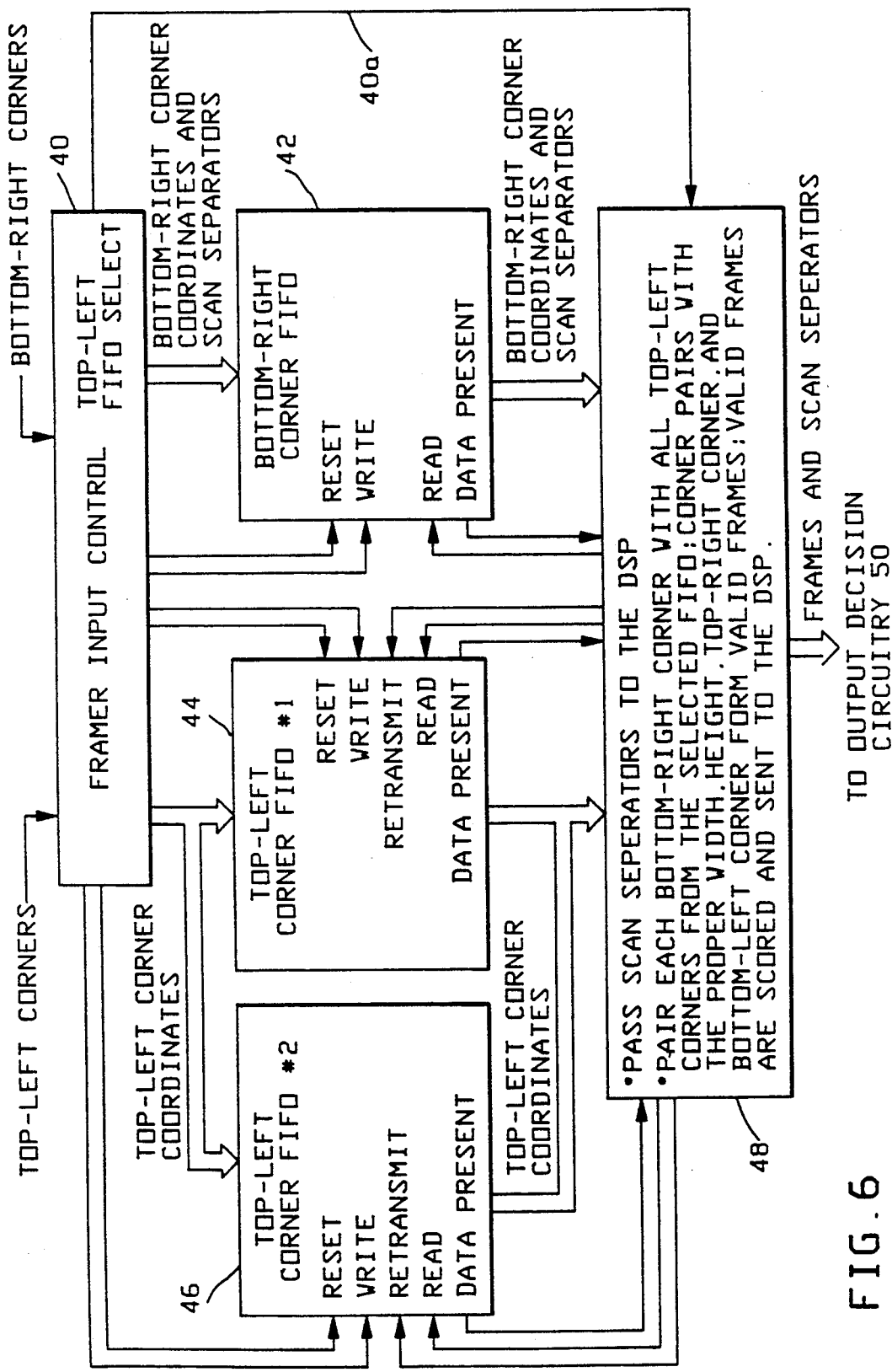
FIG. 6 is a block diagram illustrating a preferred embodiment of the framer 26 in FIG. 2.

With reference to the preferred embodiment of the framer 26 shown in FIG. 6, top-left corner (TLC) and bottom-right corner (BRC) information is applied to a framer input control 40. From there, BRC coordinates and separators are written into the bottom-right-corner FIFO 42, and potential matching TLC coordinates are simultaneously written into top-left corner FIFO#1 (44) and top-left corner FIFO#2 (46) The horizontal component of all coordinates need only contain 6 bits of an absolute scan number referenced from the right edge of the document 11 (FIG. 3). The framer input control 40 also provides appropriate reset and write signals for the FIFO's 42, 44 and 46, as shown in FIG. 6.

The framer output control 48 reads BRCs and separators from the BRC FIFO 42. Separators are sent directly to the output decision circuit 50 (FIG. 2). Each BRC is individually paired with every TLC contained in the appropriate TLC FIFO 44 or 46. Typical horizontal coordinates are illustrated in FIG. 7.

Note in FIG. 7 that a BRC in the first 32 scans (hex scans 00 through 1F) are matched with all TRCs contained in TLC FIFO#1 (TL1), while a BRC from the next 32 scans (hex scans 20 through 3F) are matched with all TRCs contained in TLC FIFO#2 (TL2). If a given BRC/TLC pair forms a frame of proper height and width for a particular font, and if the opposite corners BLC and TRC exist, then the pair creates a valid frame. Also note with respect to FIG. 7 that TL1 and TL2 are cleared of corners every 40 hex scans, TL1 being reset on hex scans 0,40, etc., and TL2 being reset on hex scans 20,60, etc.

In summary, the framer output control 48 in FIG. 6 serves to: (1) pass scan separators to the output decision (circuit 50 in FIG. 2, (2) pair each bottom-right corner (BRC) with respective top-left corners (TLC's) from the selected FIFO 44 or 46, (3) determine potentially valid frames from TLC and BRC corner pairs having acceptable width and height for the selected font, (4) select valid frames from these potentially valid frames based on the presence of the other two corners BLC and TRC of the frame, (5) score these valid frames based on how well they correspond to character size, and (6) send these scored valid frames as candidate character frames to the output decision circuitry 50 (FIG. 2). As shown in FIG. 6, the framer output control 48 provides appropriate read and retransmit signals to FIFO's 42, 44 and 46 for controlling the feeding of TLC, BRC and scan separator signals thereto, while FIFO's 42,44 and 46 provide appropriate data presence signals to the frame output control 48 to indicate when data is present as also shown in FIG. 6, framer input control 40 provides selection signals 40a to the framer output control 48 for use thereby in selecting the proper top-left FIFO 44 or 46.

A preferred state diagram for the framer output control 48 in FIG. 6 is illustrated in FIG. 8. FIG. 9 is a table setting forth the meanings of various abbreviations used in FIG. 8. The scoring of valid frames may typically be in accordance with the following equation:

$$Score = 100 - [2*abs\,(font\ width - frame\ width) + 3*abs\,(font\ height - frame\ height)]$$

Returning to FIG. 2, it will be seen that the output 26a of the just described framer 26 is applied to the output decision circuit 50. Also applied to the output decision circuit 50 are outputs from a reject flagger 52, a stroke-width finder 54 and a long vertical mark detector 56. These components 52, 54 and 56 are provided for use by the output decision circuit 50, along with the scored candidate character frames provided by framer 26, in determining which character frames are ultimately sent to the character recognition circuitry 14 (FIG. 1), and also the particular signals to be sent to CPU 15 (FIG. 1).

The reject flagger 52 in FIG. 2 operates in response to scan buffer output 18a and smearing circuit output 20b to flag marks which are much larger than an expected character size, and thereby might not produce a valid character frame using the above described smearing approach. To detect these marks, the flagger 52 uses a window of dimensions 1-pixel wide by the can't-read minimum height (the height of the smallest character in the character set). This 1-pixel wide window is passed up each column of a right smeared image (provided by smearing circuit output 20b). If the window ever fills up with a threshold number of black pixels, that column is flagged. Also, for each flagged column, the top row of the window is stored for the first and last times the window contained the threshold number of black pixels. A flagger output 52a provides the results of these operations to the output decision circuitry 50 for use in determining character frames are to be sent to character recognition circuitry 14 (FIG. 1).

The stroke-width finder 54 in FIG. 2 is provided to handle situations where a valid frame may not be recognized because of the presence of excessive paper noise (unwanted marks), or where several characters are joined together, or where an unexpected mark, such as a signature, extends into the field of characters The basic purpose of the stroke width finder 54 is to determine whether a character is present even though not found by framer 26. The stroke width finder 54 determines whether a character may be present by determining whether there are marks within a frame having stroke widths indicative of a character being present. An example of a way of determining the presence of such stroke widths is to provide a window of dimensions two-pixel high by one-pixel wide, which is moved up each scan. Whenever two consecutive black pixels (the minimum character stroke width) cause the window to fill up, a counter is reset and a zero is stored for the pixel location corresponding to the top of the window. If the window does not contain two black pixels, the counter is incremented and its value is stored. Each stored pixel location then contains the distance above the nearest stroke-width size mark (black spot) in the scan. These stored values permit a determination to be made as to whether a character is present. A stroke-width finder output 54a provides the results of these operations to output decision circuitry 50, which uses these results to send a corresponding character frame to character recognition circuitry 14 (FIG. 1) based on character pitch and previous character information.

Figure 11:
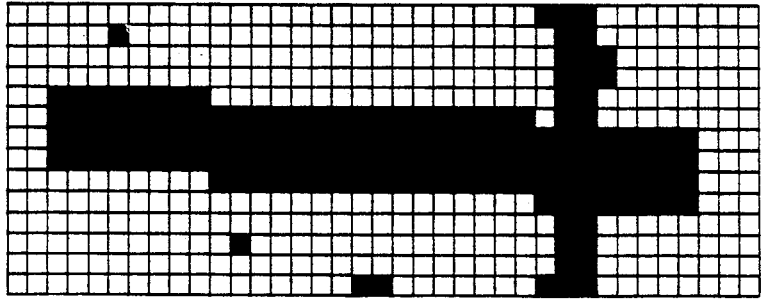
FIG. 11 illustrates an image containing an invalid long vertical marker (LVM).
Figure 10:
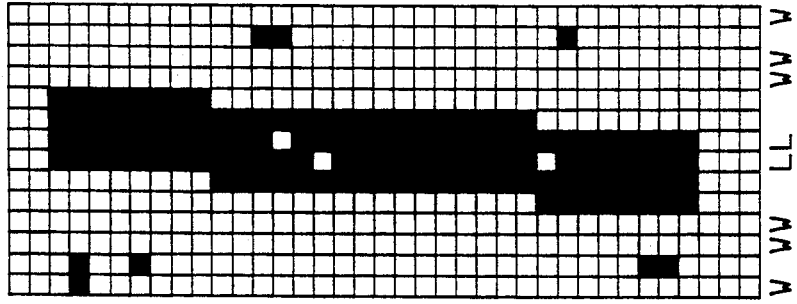
FIG. 10 illustrates an image containing a valid long vertical marker (LVM).

The long vertical mark detector 56 in FIG. 2 operates on the unsmeared scan buffer output 18a from scan buffer 18 to detect long vertical marks (LVMs) which, because of their geometry, might not provide corners indicative of a valid frame using the above-described smearing approach. An LVM may typically be defined as (1) containing between two and nine consecutive black columns, and (2) having at least one white column in the four columns adjacent to its right edge, as well as in the four columns adjacent to its left edge. A black column, for example, is one which has a black region containing 30 black pixels in a 32 pixel window. A white column, for example, is one which has no two consecutive black pixels between the highest top and lowest bottom of the black regions in the black columns. FIG. 10 illustrates an example of a valid LVM, while FIG. 11 illustrates an invalid LVM. The long vertical mark detector 56 provides an output 56a to output decision circuitry 50 indicative of detected LVM's.

Output decision circuitry 50 in FIG. 2 will now be considered in more detail. It is to be understood that the primary purpose of output decision circuitry 50 is to make final determinations of character frames to be sent to character recognition circuitry 14 (FIG. 1) in response to the scored candidate character frames provided by framer 26, and the outputs 52a, 54a and 56a of reject flagger 52, stroke width finder 54 and long vertical mark detector 56, respectively. A preferred embodiment of the output decision circuitry 50 will next be described with reference to the block and schematic diagram shown in FIG. 12.

Output decision circuitry 50 has two basic modes of operation: (1) an out-of-field mode and (2) an in-field mode. The out-of-field mode corresponds to the situation where no valid character frame has yet been found. The in-field mode corresponds to the situation where at least one valid character frame has been found. The operation of the output decision circuitry 50 with respect to these modes is controlled by a digital signal processor (DSP) 60. The decision output circuitry 50 also includes a dual port SRAM 66, a locator FIFO 68, a framer data-present port 70 a program memory 72, a data memory 74, a command/response register 76, a dynamic scan band port 78, and a character recognition circuitry port 80. Operation of the preferred embodiment of the output decision circuitry 50 shown in FIG. 12 when in each mode will now be considered in detail.

Out-of-Field Mode

The most significant bit of a data-present signal provided in the framer output 26a is monitored. If its value equals one, DSP 60 reads one word from framer FIFO port 62. Bit 15 of this word indicates whether the remaining bits contain status information on the current scan (WT=1), or whether they contain information on a frame found in the current scan (WT=0). In the former, bit 12 indicates which font parameters apply to the scan (F=0 if initial font, F=1 if second font), and bit 13 indicates if the current scan is within a document (DP=1); in the latter, bits 0 through 6 give the y-coordinate of the bottom-right corner of a frame found in the current scan, and bits 7 through 13 contain the base score of this frame. A word containing status information will occur once at the beginning of every scan, whereas a word containing frame information will occur once for every new frame found by the framer in the current scan.

Framer FIFO port 64 contains an additional word for each frame-information word found in port 61. Bits 0 through 6 of this word contain the y-coordinate of the frame's top-left corner, and bits 7 through 12 contain the horizontal distance between the bottom-right and top-left corners. Each time a frame-information word is read from port 62, framer port 64 is read to maintain a one-to-one correspondence between these words.

If a candidate character frame was found in the current scan, then the next ten scans are searched for the best frame, and in-field mode (described hereinafter) is entered. The frame with the highest base score is centered and sent via output 50a to character recognition circuitry 14 along with the corresponding scan buffer output 18a, as indicated in FIG. 2.

If no candidate character frame was found, a check is made to determine whether a long vertical mark (LVM) was detected. This is accomplished by checking SRAM 66. SRAM 66 stores information indicative of the detection of an LVM by the long vertical mark detector 56 (FIG. 2) in the previous 64 scans. Each scan produces 128 bytes of information. Bit 7 of the first byte in a scan contains a flag (R) indicating whether or not the scan is near character-sized data (i.e., R=1 if somewhere within the next smear-width number or scans, there is something as tall as the minimum height character for the current font). The remaining 7 bits give the vertical location of the top of the reject-minimum-height window the first time it fills up with a threshold (reject noise margin) number of black pixels. This value is used to find the approximate bottom of the reject region. The second byte in a scan contains the absolute top of the reject region in bits 0 through 6, bit 7 contains a flag (L) which is set whenever the scan is part of an LVM. Bytes 2 through 127 contain a value in the low-order 7 bits indicating the vertical distance above the nearest occurrence of two consecutive black pixels in that column. The most significant bit contains the actual pixel value, address bits 7 through 12 indicate the scan number, and bits 0 through 6 indicate the byte number within the scan.

If an LVM flag was found in the scan of interest, an LVM code is sent to CPU 15 (FIG. 1) via output 50c (FIG. 2). The search for a potential frame then continues in out-of-field mode at the left edge of the LVM.

If neither a potential frame nor an LVM was found, DSP 60 searches SRAM 66 in order to determine whether a reject was flagged by reject flagger 52 (FIG. 2), the result being sent to CPU 15 (FIG. 1) via output 12a. The search for a potential frame then continues in the next column.

Figure 13B:
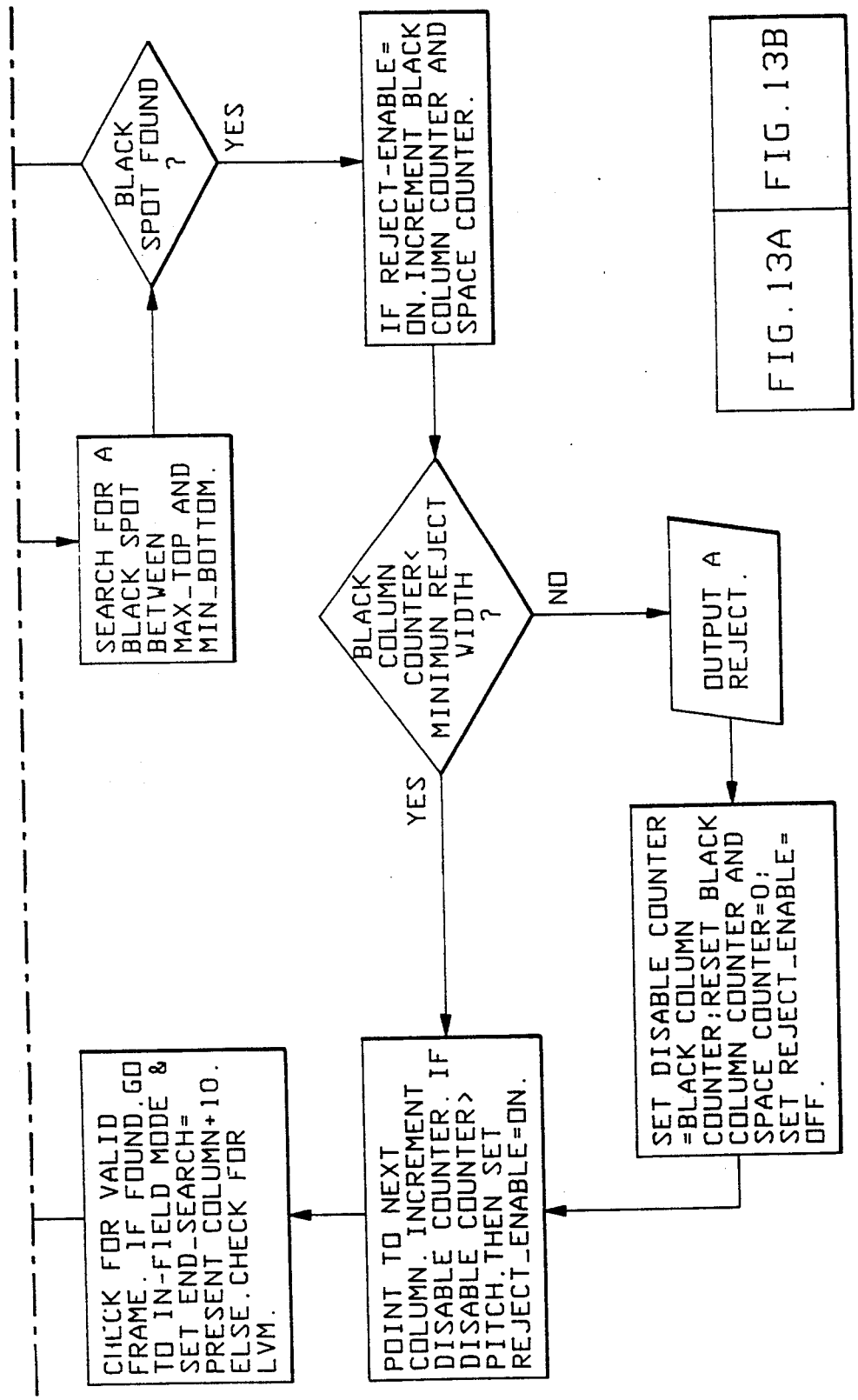

FIG. 13 is a flowchart generally illustrating pertinent typical out-of-field functions performed by the output decision circuitry 50.

In-Field Mode

All candidate character frames starting in columns from the end of the previous character to just past the expected center of the next character are examined for the best score. Bonus points are added to the score dependent on the frames's position with respect to the previous character. The final score of a candidate character frame will thus be the sum of the score provided by framer 26, based on character size, plus the bonus score provided by output decision circuitry 50, based on whether the frame is at its expected location (e.g., based on character pitch).

The resulting highest scoring candidate character frame is then chosen, and any necessary adjustments to its height or width are made using previous character information. Frames are centered in an appropriate box for the character recognition circuitry 14. The box sizes are typically 2-pixels larger than the template size in all four directions so that the recognition circuitry 14 may shift the character up, down, left, and right by two pixels.

An LVM is recognized independently of the character recognition circuitry 14. If the highest scoring frame matches the dimensions of an LVM, the frame is recognized as an LVM. If a frame is found and its dimensions do not match those of an LVM, the area between the left edge of the previous character and the right edge of the current character is checked for an LVM flag. If no frame is found, then the entire search area is checked for the presence of an LVM flag. In all these cases where an LVM is detected, only the CPU 15 (FIG. 1) is notified.

If neither a frame nor an LVM was found, a potential frame is formed using the pitch, and previous frame top and bottom information. The black-spot count provided by the stroke-width finder 54 (FIG. 2) and stored in SRAM 66 is then used to determine if there are stroke-width size marks in this region. If there are, the frame is sent to the recognition circuitry 14. Otherwise in-field mode is exited.

Figure 14:
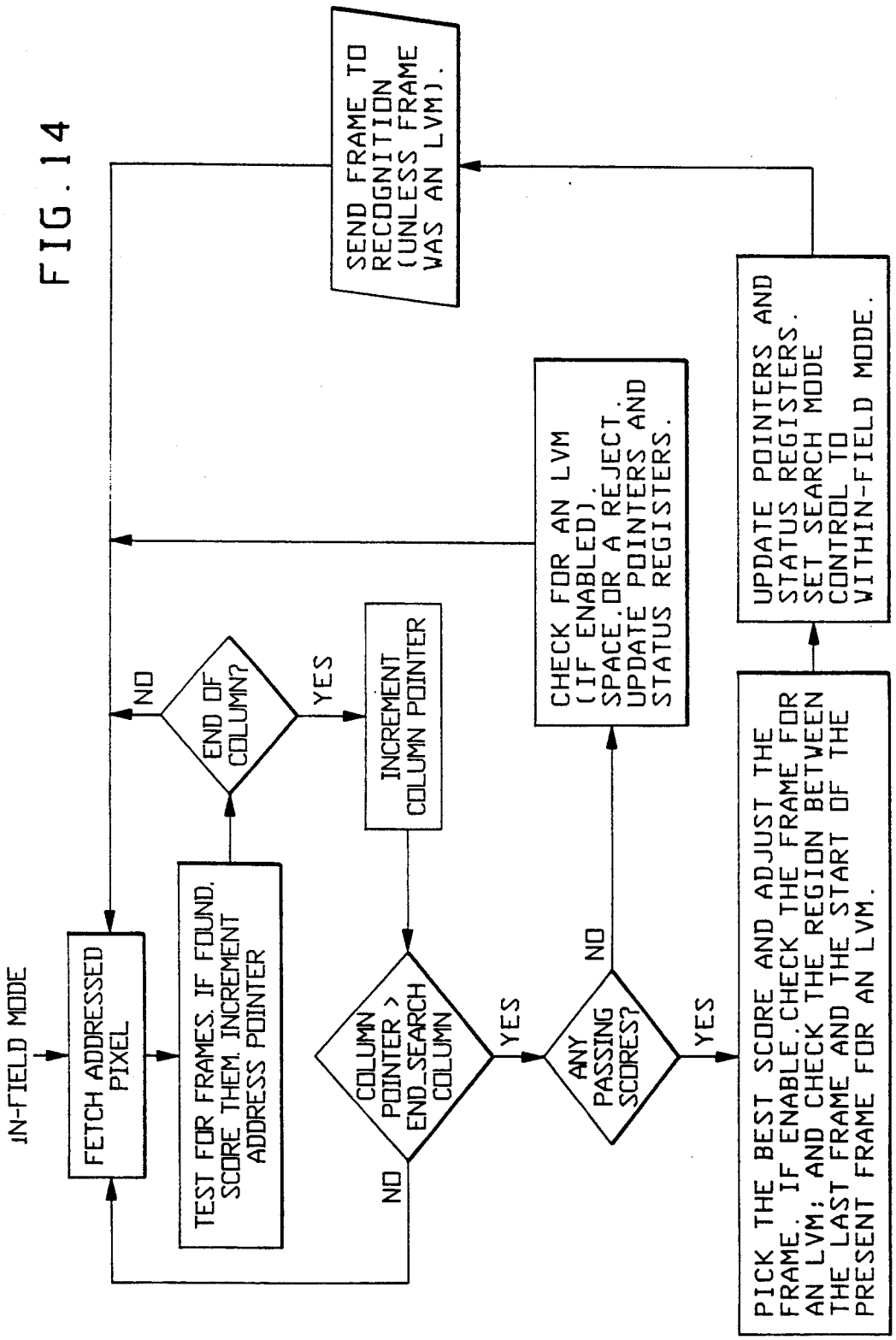
FIG. 14 is a flowchart generally illustrating pertinent typical in-field functions performed by the output decision circuitry 50 in FIG. 12.

FIG. 14 is a flowchart generally illustrating pertinent typical in-field functions performed by the output decision circuitry 50.

It will be understood that the preferred embodiment of the invention described herein is only exemplary, and that the invention is capable of many modifications and variations in construction, arrangement and use without departing from the spirit of the invention. Accordingly, the present invention is to be considered as including all modifications and variations coming within the scope of the invention as defined by the appended claims.

We claim:

1. Character locating apparatus for use in a character recognition system comprising:
   means providing an image containing potential character elements;
   a smearing circuit for smearing said elements a predetermined length related to character size in each of at least first and second directions;
   a corner detection circuit responsive to said smearing circuit for detecting a corner based on the intersection of the edges of the smeared elements in said first and second directions;
   a framer responsive to said corner detection circuit for producing candidate character frames from detected corners, said framer scoring candidate character frames based on their relation to character size;
   wherein said smearing circuit also provides for smearing in third and fourth directions different from said first and second directions, wherein said corner detection circuit also detects corners based on the intersection of edges of the smeared character elements in said third and fourth directions, and wherein said framer produces a candidate character frame by matching a corner detected in response to smearing in said first and second directions with a corner detected in response to smearing in said third and fourth directions; and
   decision circuitry responsive to the scoring provided by said framer for determining which candidate character frames are to be submitted for character recognition, said decision circuitry adding a bonus score to a candidate character frame based on whether it is at an expected location, the resulting highest scoring candidate character frame being submitted for character recognition.

2. The apparatus of claim 1, wherein said first and second directions are perpendicular.

3. The apparatus of claim 1, wherein said characters are arranged in a row, wherein said first direction is parallel to said row and said second direction is perpendicular to said row.

4. The apparatus of claim 1, wherein characters are arranged in a row, wherein said first and third directions are perpendicular to said row and opposite to one another, and wherein said second and fourth directions are parallel to said row and opposite to one another.

5. The apparatus of claim 4, wherein said smearing is approximately one character height up and down and one character width left and right.

6. The apparatus of claim 4, including a corner filter coupled to said corner detection circuit for making a density check with respect to a corner detected by said corner detection circuit to determine whether the corner is valid, the output of said corner filter being applied to said framer for discarding invalid corners.

7. The apparatus of claim 1, wherein said decision circuitry has a first operating mode corresponding to the situation where no valid character frame has been found and a second operating mode corresponding to the situation where at least one valid frame has been found.

8. Character locating apparatus for use in a character recognition system for recognizing a row of characters, said apparatus comprising:
   image capture means providing images corresponding to the scanning of a row of characters, wherein one or more of said images contain character elements;
   a scan buffer for successively storing images produced by said image capture means;
   a smearing circuit coupled to said scan buffer for smearing character elements in an image in first and second directions, said first direction being parallel to said row and said second direction being perpendicular to said row;
   a corner detection circuit coupled to said smearing circuit for detecting a corner based on the intersection of the edges of the smeared character elements in said first and second directions,
   a corner filter coupled to said corner detection circuit for making a density check with respect to a corner detected by said corner detection circuit to determine whether the corner is valid,
   a framer coupled to said corner filter for producing candidate character frames in response to valid corners detected by said corner detection circuit; and
   decision circuitry coupled to said framer for determining which of said candidate character frames are to be submitted for character recognition.

9. The apparatus of claim 8, wherein said smearing circuit also provides for smearing in third and fourth directions, said third direction being parallel and opposite to said first direction and said fourth direction being parallel and opposite to said second direction, wherein said corner detection circuit detects corners based on the intersection of the edges of the smeared character elements in said third and fourth directions, and wherein said framer produces a candidate character frame by matching a corner detected in response to smearing in said first and second directions with a corner detected in response to smearing in said third and fourth directions.

10. The apparatus of claim 9, wherein said framer scores candidate character frames based on their relation to character size and applies said scores to said decision circuitry, and wherein said decision circuitry uses said scores to determine which character frames are to be submitted for character recognition.

11. The apparatus of claim 10, wherein said decision circuitry adds a bonus score to a candidate character frame based on whether it is at an expected location, the resulting highest scoring candidate character frame being submitted for character recognition.

12. The apparatus of claim 9, including a stroke-width finder coupled to said scan buffer for determining the potential presence of a character based on determining whether an image contains marks having stroke widths indicative of a character being present, the output of said stroke-width finder being applied to said decision circuitry.

13. The apparatus of claim 9, including a long vertical mark detector coupled to said scan buffer for detecting long vertical marks, the output of said vertical mark detector being applied to said decision circuitry.

14. The apparatus of claim 9, including a reject flagger coupled to said smearing circuit for flagging marks which are much larger than an expected character size, the output of said reject flagger being applied to said decision circuitry.

15. An electronically implemented method for locating a character in a row of characters in a character recognition system comprising:

scanning said row to provide images containing character elements;

storing said character elements;

smearing the stored character elements in at least first and second different directions, said first direction being parallel to said row and said second direction being perpendicular to said row;

detecting a corner of a character based on the intersection of the edges of the smeared character elements in said first and second directions;

filtering detected corners by making a density check with respect to a detected corner to determine whether the corner is valid;

producing candidate character frames in response to valid detected corners; and determining which character frames are to be submitted for character recognition based on the likelihood of the character frame containing a character.

16. The method of claim 15, wherein said smearing also smears said character elements in third and fourth directions different from said first and second directions.

17. The method of claim 16, wherein said characters are arranged in a row, wherein said first and third directions are parallel to said row and opposite to one another, wherein said second and fourth directions are perpendicular to said row and opposite to one another, wherein said detecting also detects a corner based on the intersection of the edges of the smeared character elements in said third and fourth directions, and wherein said producing includes matching a corner detected in response to smearing in said first and second directions with a corner detected in response to smearing in said third and fourth directions.

18. The method of claim 17, wherein said smearing is approximately one character height in said second and fourth directions and one character width in said first and third directions.

19. The method of claim 17, wherein said producing includes scoring candidate character frames based on character size, and wherein said determining selects a character frame for submission to character recognition based on said scoring.

20. The method of claim 19, wherein said determining includes adding a bonus score to a candidate character frame based on whether it is at an expected location.

21. Character locating apparatus for use in a character recognition system for recognizing a row of characters, said apparatus comprising:

image capture means providing images corresponding to the scanning of a row of characters, wherein one or more of said images contain character elements;

a scan buffer or successively storing images produced by said image capture means;

a smearing circuit coupled to said scan buffer for smearing character elements in an image in first and second directions, said first direction being parallel to said row and said second direction being perpendicular to said row;

a corner detection circuit coupled to said smearing circuit for detecting a corner based on the intersection of the edges of the smeared character elements in said first and second directions a framer coupled to said corner detection circuit for producing candidate character frames in response to corners detected by said corner detection circuit said framer scoring candidate character frames based on their relation to character size; and decision circuitry coupled to said framer for determining which of said candidate character frames are to be submitted for character recognition based on said scoring, said decision circuitry adding a bonus score to a candidate character frame based on whether it is at an expected location, the resulting highest scoring candidate character frame being submitted for character recognition, wherein said smearing circuit also provides for smearing in third and fourth directions, said third direction being parallel and opposite to said first direction and said fourth direction being parallel and opposite to said second direction, wherein said corner detection circuit detects corners based on the intersection of the edges of the smeared character elements in said third and fourth directions, and wherein said framer produces a candidate character frame by matching a corner detected in response to smearing in said first and second directions with a corner detected in response to smearing in said third and fourth directions.

22. Character locating apparatus for use in a character recognition system for recognizing a row of characters, said apparatus comprising:

image capture means providing images corresponding to the scanning of a row of characters, wherein one or more of said images contain character elements;

a scan buffer for successively storing images produced by said image capture means;

a smearing circuit coupled to said scan buffer for smearing character elements in an image in first and second directions, said first direction being parallel to said row and said second direction being perpendicular to said row;

a corner detection circuit coupled to said smearing circuit for detecting a corner based on the intersection of the edges of the smeared character elements in said first and second directions;

a framer coupled to said corner detection circuit for producing candidate character frames in response to corners detected by said corner detection circuit;

a stroke-width finder coupled to said framer for determining the potential presence of a character based on determining whether an image contains marks having stroke widths indicative of a character being present; and decision circuitry coupled to said framer and to said stroke-width finder for determining which of said candidate character frames are to be submitted for character recognition;

wherein said smearing circuit also provides for smearing in third and fourth directions, said third direction being parallel and opposite to said first direction and said fourth direction being parallel and opposite to said second direction, wherein said corner detection circuit detects corners based on the intersection of the edges of the smeared character elements in said third and fourth directions, and wherein said framer produces a candidate character frame by matching a corner detected in response to smearing in said first and second directions with a corner detected in response to smearing in said third and fourth directions.

23. Character locating apparatus for use in a character recognition system for recognizing a row of characters, said apparatus comprising:

image capture means providing images corresponding to the scanning of a row of characters, wherein one or more of said images contain character elements;

a scan buffer for successively storing images produced by said image capture means;

a smearing circuit coupled to said scan buffer for smearing character elements in an image in first and second directions, said first direction being parallel to said row and said second direction being perpendicular to said row;

a corner detection circuit coupled to said smearing circuit for detecting a corner based on the intersection of the edges of the smeared character elements in said first and second directions;

a framer coupled to said corner detection circuit for producing candidate character frames in response to corners detected by said corner detection circuit; and a long vertical mark detector coupled to said scan buffer for detecting long vertical marks; and decision circuitry coupled to said framer and to said long vertical mark detector for determining which of said candidate character frames are to be submitted for character recognition;

wherein said smearing circuit also provides for smearing in third and fourth directions, said third direction being parallel and opposite to said first direction and said fourth direction being parallel and opposite to said second direction, wherein said corner detection circuit detects corners based on the intersection of the edges of the smeared character elements in said third and fourth directions, and wherein said framer produces a candidate character frame by matching a corner detected in response to smearing in said first and second directions with a corner detected in response to smearing in said third and fourth directions.

24. Character locating apparatus for use in a character recognition system for recognizing a row of characters, said apparatus comprising:

image capture means providing images corresponding to the scanning of a row of characters, wherein one or more of said images contain character elements;

a scan buffer for successively storing images produced by said image capture means;

a smearing circuit coupled to said scan buffer for smearing character elements in an image in first and second directions, said first direction being parallel to said row and said second direction being perpendicular to said row;

a corner detection circuit coupled to said smearing circuit for detecting a corner based on the intersection of the edges of the smeared character elements in said first and second directions;

a framer coupled to said corner detection circuit for producing candidate character frames in response to corners detected by said corner detection circuit;

a reject flagger coupled to said smearing circuit for flagging marks which are much larger than an expected character size;

decision circuitry coupled to said framer and to said reject flagger for determining which of said candidate character frames are to be submitted for character recognition;

wherein said smearing circuit also provides for smearing in third and fourth directions, said third direction being parallel and opposite to said first direction and said fourth direction being parallel and opposite to said second direction, wherein said corner detection circuit detects corners based on the intersection of the edges of the smeared character elements in said third and fourth directions, and wherein said framer produces a candidate character frame by matching a corner detected in response to smearing in said first and second directions with a corner detected in response to smearing in said third and fourth directions.

25. Character locating apparatus for use in a character recognition system comprising:

means providing an image containing potential character elements;

a smearing circuit for smearing said elements a predetermined length related to character size in each of at least first and second directions;

a corner detection circuit responsive to said smearing circuit for detecting a corner based on the intersection of the edges of the smeared elements in said first and second directions;

a corner filter coupled to said corner detection circuit for making a density check with respect to a corner detected by said corner detection circuit to determine whether the corner is valid, a framer responsive to said corner filter for producing candidate character frames in response to valid detected corners;

wherein said smearing circuit also provides for smearing in third and fourth directions different from said first and second directions, wherein characters are arranged in a row, wherein said first and third directions are perpendicular to said row and opposite to one another, and wherein said second and fourth directions are parallel to said row and opposite to one another, wherein said corner detection circuit also detects corners based on the intersection of edges of the smeared character elements in said third and fourth directions, and wherein said framer produces a candidate character frame by matching a corner detected in response to smearing in said first and second directions with a corner detected in response to smearing in said third and fourth directions; and decision circuitry responsive to said framer for determining which candidate character frames are to be submitted for character recognition.

26. Character locating apparatus for use in a character recognition system comprising:

means providing an image containing potential character elements;

a smearing circuit for smearing said elements a predetermined length related to character size in each of at least first and second directions;

a corner detection circuit responsive to said smearing circuit for detecting a corner based on the intersection of the edges of the smeared elements in said first and second directions;

a framer responsive to said corner detection circuit for producing candidate character frames detected corners;

wherein said smearing circuit also provides for smearing in third and fourth directions different from said first and second directions, wherein said corner detection circuit also detects corners based on the intersection of edges of the smeared character elements in said third and fourth directions, and wherein said framer produces a candidate character frame by matching a corner detected in response to smearing in said first and second directions with a corner detected in response to smearing in said third and fourth directions; and decision circuitry responsive to said framer for determining which candidate character frames are to be submitted for character recognition, said decision circuitry having a first operating mode corresponding to the situation where no valid character frame has been found and a second operating mode corresponding to the situation where at least one valid frame has been found;

wherein said framer scores candidate character frames based on their relation to character size and applies said scores to said decision circuitry, and wherein said decision circuitry uses said scores to determine which character frames are to be submitted for character recognition.

27. An electronically implemented method for locating characters in a character recognition system comprising:

providing an image containing character elements;

smearing said character elements in first, second, third and fourth different directions;

detecting a corner based on the intersection of the edges of the smeared character elements in said first and second directions;

producing candidate character frames in response to detected corners, said producing includes scoring candidate character frames based on character size; and wherein said characters are arranged in a row, wherein said first and third directions are parallel to said row and opposite to one another, wherein said second and fourth directions are perpendicular to said row and opposite to one another, wherein said detecting also detects a corner based on the intersection of the edges of the smeared character elements in said third and fourth directions, and wherein said producing includes matching a corner detected in response to smearing in said first and second directions with a corner detected in response to smearing in said third and fourth directions; and determining which character frames are to be submitted for character recognition based on said scoring, a bonus score being added to a candidate character frame based on whether it is at an expected location.

* * * * *